US008435411B2

(12) United States Patent  (10) Patent No.: US 8,435,411 B2
Lean et al.  (45) Date of Patent: May 7, 2013

(54) METHODS AND COMPOSITIONS FOR THE REMOVAL OF IMPURITIES FROM AN IMPURITY-LOADED ORGANIC SALT (75) Inventors: John Lean, Naugatuck, CT (US); Scott Griffin, Stamford, CT (US); Matthew Taylor, New York, NY (US)

(73) Assignee: Cytec Technology Corp., Wilmington, DE (US)

( * ) Notice: Subject to any disclaimer, the term of this patent is extended or adjusted under 35 U.S.C. 154(b) by 105 days.

(21) Appl. No.: 12/959,436

(22) Filed: Dec. 3, 2010

(65) Prior Publication Data

US 2011/0140037 A1 Jun. 16, 2011

Related U.S. Application Data (60) Provisional application No. 61/286,430, filed on Dec. 15, 2009.

(51) Int. Cl.
*C02F 1/54* (2006.01)
(52) U.S. Cl.
USPC ............... 210/666; 568/9; 210/663; 210/665
(58) Field of Classification Search ... 568/9; 252/182.3; 210/602, 605, 749, 666, 665, 663
See application file for complete search history.

(56) References Cited

U.S. PATENT DOCUMENTS

| 2,710,250 | A | | 6/1955 | Andrews et al. |
| 3,180,703 | A | * | 4/1965 | Ableson et al. ............ 423/7 |
| 4,036,931 | A | | 7/1977 | Robertson et al. |
| 4,275,042 | A | | 6/1981 | Lever |
| 4,280,987 | A | | 7/1981 | Yamada et al. |
| 4,496,524 | A | | 1/1985 | Bush et al. |
| 4,559,203 | A | | 12/1985 | Bauer et al. |
| 4,578,255 | A | | 3/1986 | Roe et al. |
| 4,902,425 | A | * | 2/1990 | Keeney ..................... 210/634 |
| 5,229,086 | A | * | 7/1993 | Lam et al. ................. 423/54 |
| 5,284,634 | A | | 2/1994 | Strominger et al. |
| 5,385,586 | A | | 1/1995 | Farquharson et al. |
| 5,849,172 | A | | 12/1998 | Allen et al. |
| 6,293,973 | B1 | | 9/2001 | Farquharson et al. |
| 7,067,106 | B2 | | 6/2006 | Malito |
| 7,192,563 | B2 | * | 3/2007 | Singh et al. .................. 423/3 |
| 7,914,679 | B2 | | 3/2011 | Delapierre et al. |
| 2007/0142213 | A1 | | 6/2007 | Elomari et al. |
| 2008/0185339 | A1 | | 8/2008 | Delapierre et al. |
| 2009/0169447 | A1 | * | 7/2009 | Taylor et al. ................. 423/130 |

FOREIGN PATENT DOCUMENTS

| GB | 2122593 | A | * | 1/1984 |
| JP | 06-192761 | | * | 7/1994 |
| JP | 06192761 | | | 7/1994 |
| WO | 9722556 | A1 | | 6/1997 |
| WO | 2007066143 | A2 | | 6/2007 |
| WO | 2007066143 | A3 | | 6/2007 |

OTHER PUBLICATIONS

Misato Hironaka, et al., "Kinetics of Lactic Acid Extraction with Quaternary Ammonium Salt, Separation Science and Technology;" 36(13); 2927-2943 (2001).
International Search Report for PCT/US2010/058541; mailing date Jun. 8, 2011.
Written Opinion for PCT/US2010/058541; mailing date Jun. 8, 2011.
International Search Report for PCT/2008/087963, mailing date May 19, 2009.
Written Opinion for PCT/2008/087963, mailing date May 19, 2009.
Foster et al., "Removal of HMV Compounds by Partial Wet Oxidation;" Light Metals; 1988; pp. 79-85; Phoenix, AZ.
Stuart, A. D.; "Removal of Organics from Bayer Spent Liquors Using Manganese Dioxide;" 117th TMS Light Metals Committee; 1988; pp. 95-102; Phoenix, AZ.
Brown, N.; "Kinetics of Copper-Catalysed Oxidation of Bayer Liquor Organics;" Light Metals; 1989; pp. 121-130.
The, P.J. et al., "Solubility of Sodium Oxalate in Bayer Liquor and a Method of Control;" Light Metals; 1987; pp. 5-10.
Bangun et al., "The Photodegradation Kinetics of Aqueous Sodium Oxalate Solution Using TiO2 Catalyst" Applied Catalysis A: Gen. 175; 1998; pp. 221-235.
Tran et al., "Oxidation of Organics in Simulated Bayer Liquors Using Maganese Dioxide Ore;" Light Metals; 1986; pp. 217-223.
Yamada et al., "Oxidation of Organic Substances in the Bayer Process;" Light Metals; 1981; pp. 117-128.
Williams et al., "Enhanced Oxalate Removal Utilizing the Mutifunctional Purox Process;" Light Metals; 1998; pp. 81-87.
Pulpeiro et al., "Sizing an Organic Control System for the Bayer Process;" Light Metals; 1998; pp. 89-95.
Farquharson et al., "Development of an Effective Liquor Oxalater Stabilizer;" Light Metals; 1995; pp. 95-101.
Hollanders et al., "Calcination of Sodium Oxalate/Bauxite Mixtures;" Light Metals; 1994; pp. 91-97.
Kumar, S.; "Incineration of Sodium Oxalate/Fuel Oil Slurry in a Rotary Calciner;" Light Metals; 1991; pp. 1229-1234.
Perrotta et al., "Hydrocalumite Formation in Bayer Liquor and Its Promotional Effect on Oxalate Precipitation;" Light Metals; 1995; pp. 77-87.
Perrotta et al., "Layered Double Hydroxide Formation in Bayer Liquor and Its Promotional Effect on Oxalate Precipitation;" Light Metals; 1998; pp. 17-28.
Shibue et al., "Liquor Burning Process—Its Modification and Increase in Capacity;" Light Metals; 1990; pp. 35-40.
Pareek et al., "Photocausticization of Spent Bayer Liquor: a Pilot-Scale Study;" Advances in Environmental Research 7; 2003; pp. 411-420.

* cited by examiner

*Primary Examiner* — Johann R Richter
*Assistant Examiner* — Pancham Bakshi
(74) *Attorney, Agent, or Firm* — David P. LeCroy (57) ABSTRACT

Methods of removing impurities from an impurity-loaded organic salt solution by intermixing the impurity-loaded organic salt solution with a stripping solution to form a biphasic mixture, wherein the intermixing effectively reduces the concentration of impurities in the impurity-loaded organic salt, thereby removing impurities from the organic salt and forming an impurity-reduced organic salt solution phase and a stripping solution phase are provided herein.

25 Claims, 2 Drawing Sheets

Figure 1. Change in percent impurities removed with hydroxide concentration.

FIGURE 2

METHODS AND COMPOSITIONS FOR THE REMOVAL OF IMPURITIES FROM AN IMPURITY-LOADED ORGANIC SALT

CROSS-REFERENCE TO RELATED APPLICATIONS

This application claims benefit of priority from U.S. Provisional Application No. 61/286,430, filed Dec. 15, 2009 the content of which is incorporated herein by reference in its entirety.

BACKGROUND

1. Field

The disclosed subject matter relates generally to methods and compositions for treating industrial process streams. More particularly, it relates to methods for the removal of impurities from an impurity-loaded organic salt.

2. Related Art

Certain organic salts, often referred to as "ionic liquids," are increasingly being investigated as reusable (i.e., "green") solvents and reagents in industrial applications due to the unique properties provided by these organic salts. However, recycling or regenerating these organic salts to a useable form on an industrial scale has not been addressed. Whether these organic salts are being used for extraction of desirable products, extraction of impurities, or as solvents for reactions, it is widely accepted that impurities and/or products will build up in the system and ultimately lead to system failure.

An example of a process utilizing an organic salt to extract impurities from a process stream is the Bayer process. In a typical commercial Bayer Process, raw bauxite is pulverized to a finely divided state. The pulverized ore is then fed to a slurry mixer where a slurry is prepared using spent liquor and added caustic (sodium hydroxide). This bauxite slurry is then diluted and sent through a series of digesters where about 98% of the total available alumina is extracted from the ore which may contain both trihydrate and monohydrate forms of alumina. The effluent from the digesters passes through a series of flash or blow-off tanks wherein heat and condensate are recovered as the digested slurry is cooled and brought to atmospheric pressure. The aluminate liquor leaving the flashing operation typically contains about 1-20% solids, which include the insoluble residues that remain after reaction between the bauxite ore and basic material used to digest the ore and the insoluble components which precipitate during digestion.

The coarser solid particles are generally removed with a "sand trap" cyclone. To separate the finer solid particles from the liquor, the slurry is typically fed to the center well of a mud settler (also called a "decanter", a "residue thickener" or a "raking thickener") where it is treated with a flocculant. As the mud settles, clarified sodium aluminate solution, referred to as "green" or "pregnant" liquor, overflows a weir at the top of the mud settling tank and is passed to subsequent processing steps. The settled solids (commonly referred to as "red mud") are withdrawn from the bottom of the mud settler and passed through a countercurrent washing circuit (called "the washer train") for further recovery of sodium aluminate and soda. Aluminate liquor overflowing the settler (settler or thickener overflow) still contains various impurities, both dissolved and undissolved, including typically 50 to 200 mg of undissolved suspended solids per liter. This liquor is then generally further clarified by filtration to remove undissolved suspended solids to give a filtrate with about 10 mg or less of undissolved suspended solids per liter of liquor. Alumina, in relatively pure form, is then precipitated from the filtrate as alumina trihydrate crystals. The remaining aqueous organic salt solution or spent liquor may be concentrated to form "strong" liquor, from which additional alumina trihydrate may be precipitated and from which additional spent liquor may be generated. The spent liquor streams are typically returned to the initial digestion step and employed as a digestant of additional ore after being reconstituted with additional caustic.

Bauxite ore generally contains organic and inorganic impurities, the amounts of which are specific to the bauxite source. During the early stages of digestion, Bayer liquor contains a wide variety of organic compounds including polybasic acids, polyhydroxy acids, alcohols and phenols, benzenecarboxylic acid, humic and fulvic acids, lignin, cellulose, and other carbohydrates. Under alkaline, oxidative conditions such as those existing in the Bayer system, these complex organic molecules break-down to form other compounds such as sodium salts of formic, succinic, acetic, lactic and oxalic acids. Predominant among these is sodium oxalate.

Sodium oxalate has a low solubility in caustic solutions and thus, if not adequately controlled, tends to precipitate in an acicular (fine, needle-like) form in regions of the Bayer circuit where there is an increase in causticity or decrease in temperature. These fine sodium oxalate needles can nucleate alumina trihydrate and inhibit its agglomeration, resulting in fine, undesirable gibbsite particles which are difficult to classify and are less than ideal for calcination. The excessive generation of fine particles can lead to blocking of the pores in the filter cloths during filtration of the thickener overflow liquor, hence undesirably decreasing the rate of filtration.

During the calcination stage, oxalate can decompose to leave fragile alumina particles having high sodium content, which in turn can increase the cost of aluminum production and subsequently produce undesirable levels of $CO_2$ emissions. Additionally, due to the formation of sodium oxalate: (1) scale growth may be increased; (2) there may be an increase in liquor boiling point; (3) caustic losses may be observed in the circuit (due to the formation of organic sodium salts); and/or (4) the Bayer liquor viscosity and density may be increased, resulting in increased material transport costs.

The presence of oxalate and/or other organic species such as glucoisosaccharinate, gluconate, tartrate, and mannitol may decrease gibbsite precipitation yield. The presence of gluconate may reduce gibbsite growth rate. The presence of humic substances in Bayer liquor is common. Due to their surfactant nature, medium and high molecular weight humic substances are often responsible for liquor foaming and interference with red mud flocculation. High levels of organic material in Bayer liquor may also result in a decrease in coagulation efficiency and supernatant clarity during the red mud circuit. Alumina trihydrate containing high levels of organic matter also tends to produces a final product having an undesirably high level of coloration and/or impurity level.

As the Bayer process is cyclic, organic matter entering the process stream tends to accumulate with each cycle of the process, with steady state impurity concentration determined by process input and output streams. Both the red mud circuit and the gibbsite product are exit routes for organic impurities in the Bayer process. It has been shown that certain organic salts i.e., "ionic liquids," can be utilized to remove impurities from the Bayer process. In an effort to minimize costs, it may be desirable to reutilize the organic salt utilized to remove impurities.

A few methods have been reported regarding the recycling or regeneration of organic salts, i.e., ionic liquids. Hydrophobic organic salts have been regenerated by extracting impurities therefrom with a solvent that the organic salt is not soluble in, but the impurities are. However, the process has not been shown to be completely effective, since the organic salts lose activity over multiple regeneration cycles.

In another method of regeneration, sodium chloride has been shown to be an effective extractant for lactic acid coordinated to quaternary ammonium in an organic solvent. This method of regeneration operates on simple ion exchange. Additional method of regeneration of certain organic salts include, but are not limited to, use of supercritical carbon dioxide, pervaporation, distillation of impurities, use of alkaline solutions, electrolysis and nanofiltration. Nevertheless, the processes known to date do not have the scale necessary for large industrial applications.

SUMMARY OF THE INVENTION

One aspect relates to a method of removing impurities from an organic salt, the method comprising: providing an impurity-loaded organic salt solution; and intermixing the impurity-loaded organic salt solution with a stripping solution to form a biphasic mixture, wherein the intermixing is effective to reduce the concentration of impurities in the impurity-loaded organic salt, thereby removing impurities from the organic salt and forming an impurity reduced organic salt solution phase and a primarily stripping solution phase.

Another aspect relates to a composition comprising: a washed organic salt having a cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium; and an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ($[NTF_2]^-$), tetrafluoroborate, and hexafluorophosphate.

Another aspect relates to a method of removing impurities from an industrial process stream, the method comprising: providing an organic salt solution that comprises an impurity-extracting amount of an organic salt, wherein the organic salt solution is at least partially immiscible with an industrial process stream comprising impurities; intermixing the industrial process stream with the organic salt solution to form a first biphasic mixture, wherein the intermixing is effective to reduce the concentration of impurities in the industrial process stream to form a phase containing an impurity-loaded organic salt solution and a phase containing an impurity reduced industrial process stream; intermixing the impurity-loaded organic salt solution with a stripping solution to form a second biphasic mixture, wherein the intermixing of the impurity-loaded organic salt solution and the stripping solution is effective to reduce the concentration of impurities in the impurity-loaded organic salt solution and forming an impurity reduced organic salt solution; and optionally intermixing the impurity reduced organic salt solution with a wash solution to form a third biphasic mixture, wherein the intermixing is effective to form a washed organic salt phase and a wash solution phase.

Yet a further aspect relates to a method of removing impurities from an organic salt, the method comprising: providing an impurity-loaded organic salt solution, wherein the impurities in the impurity loaded organic salt solution are obtained from a Bayer process stream; and intermixing the impurity-loaded organic salt solution with a stripping solution to form a biphasic mixture, wherein the intermixing is effective to reduce the concentration of impurities in the impurity-loaded organic salt, thereby removing impurities from the organic salt and forming an impurity reduced organic salt solution phase and a primarily stripping solution phase.

A further aspect relates to a method of removing impurities from an organic salt, the method comprising: providing an impurity-loaded organic salt solution, wherein the impurities are selected from a group consisting of humates, humate decomposition products, metals, oxalate, acetate, formate, sulfate, chloride, fluoride, phosphate and combinations thereof; and intermixing the impurity-loaded organic salt solution with a stripping solution to form a biphasic mixture, wherein the intermixing is effective to reduce the concentration of impurities in the impurity-loaded organic salt, thereby removing impurities from the organic salt and forming an impurity reduced organic salt solution phase and a primarily stripping solution phase.

These and other embodiments are described in greater detail below.

BRIEF DESCRIPTION OF FIGURES

Referring now to the Figures, which are exemplary embodiments.

DETAILED DESCRIPTION OF CERTAIN EMBODIMENTS OF THE INVENTION

Various embodiments described herein relate to compositions and methods of regenerating certain organic salts that are used to remove certain compounds, e.g., impurities, from industrial process streams. Examples of suitable organic salts are described herein and include so-called "ionic liquids."

The organic salts are not limited to contain certain cations or anions. However, in one embodiment, the organic salt includes a quaternary organic cation. Examples of quaternary organic cations include phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium. Those skilled in the art will understand that the foregoing examples of quaternary organic cations encompass substituted versions thereof, including the following:

Phosphonium

Ammonium $R^a, R^b, R^c, R^d, R^e, R^f$, are each independently selected from a hydrogen, or an optionally substituted $C_1$-$C_{50}$ alkyl group, where the optional substituents include one or more selected from alkyl, cycloalkyl, alkenyl, cycloalkynyl alkynyl, alkoxy, alkoxyalkyl, aldehyde, ester, ether, ketone, carboxylic acid, alcohol, carboxylate, hydroxyl, nitro, silyl, aryl and halide functionalities. $R^a$ through $R^f$ each individually comprise from about 1 to about 50 carbon atoms, e.g., from about 1 to about 20 carbon atoms. It will be appreciated that two or more of $R^a$ through $R^f$ may form a ring structure.

$R_1$ through $R_7$ are each independently selected from hydrogen, halogen, or an optionally substituted $C_1$-$C_{50}$ alkyl group, where the optional substituents include one or more selected from alkyl, cyclocalkyl, alkenyl, cycloalkynyl, alkynyl, alkoxy, alkoxyalkyl, aldehyde, ester, ether, ketone, carboxylic acid, alcohol, carboxylate, hydroxyl, nitro, silyl, aryl and halide functionalities. $R_1$ through $R_7$ each individually comprise from about 1 to about 50 carbon atoms, e.g., from about 1 to about 20 carbon atoms. It will be appreciated that two or more of $R_1$ through $R_7$ may form a ring structure.

The term "alkyl" as used herein can be branched or unbranched hydrocarbon group comprising of 1 to 50 carbon atoms (i.e., methyl, ethyl, n-propyl, isopropyl, n-butyl, isobutyl, t-butyl, pentyl, hexyl, heptyl, octyl, nonyl, decyl, dodecyl, tetradecyl, hexadecyl, etc.). The alkyl group can be unsubstituted or substituted with one or more substituents including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below. The term "alkyl" is generally used to refer to both unsubstituted alkyl groups and substituted alkyl groups; the substituted alkyl groups used herein are described by referring to the specific substituent or substituents. For instance, "alkylamino" describes an alkyl group that is substituted with one or more amino groups, as described below. The term "halogenated alkyl" describes an alkyl group that is substituted with one or more halide (e.g., fluorine, chlorine, bromine, or iodine). When "alkyl" is used in one case and a specific term such as "alkylalcohol" is used in another, it is not meant to suggest that the term "alkyl" does not also refer to specific terms such as "alkylalcohol" and the like. When using a general term such as "alkyl" and a specific term such as "alkylalcohol" it is not implied that the general term does not also include the specific term. This practice is also used for other terms described herein.

The term "alkoxy" denotes an alkyl group bound through a single, terminal ether linkage; that is, an "alkoxy" group can be defines as —OR where R is alkyl as defined above.

The term "alkenyl" is a substituted or unsubstituted hydrocarbon group comprising 2 to 50 carbon atoms which contains at least one carbon-carbon double bond. The term "alkenyl" includes any isomers in which the compound may exist. The alkenyl group can be substituted with one or more groups including, but not limited to, alkyl, alkoxy alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The term "halogenated alkyl" as used herein, is an alkyl group which is substituted with at least one halogen (e.g., fluoride, chloride, bromide, iodide). The halogenated alkyl can also be unsubstituted, or substituted with one or more groups including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The term "alkynyl" denotes a substituted or unsubstituted hydrocarbon group comprising of 2 to 50 carbon atoms which contains at least one carbon-carbon triple bond. The alkynyl group can be substituted with one or more groups including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro, as described below.

The term "aryl" is a hydrocarbon group that comprises of one or more aromatic rings including, but not limited to phenyl, naphthyl, biphenyl, and the like. The term includes "heteroaryl" which is an aromatic group that contains at least one heteroatom within the aromatic ring. A heteroatom can be, but is not limited to, oxygen, nitrogen, sulfur, and phosphorus. The aryl group can be unsubstituted, or substituted with one or more groups including, but not limited to, alkyl, alkoxy, alkenyl, halogenated alkyl, alkynyl, aryl, heteroaryl, aldehyde, ketone, amino, hydroxyl, carboxylic acid, ether, ester, thiol, sulfo-oxo, silyl, sulfoxide, sulfonyl, sulfone, halide, or nitro.

The term "aldehyde" refers to a —(CO)H group (where (CO) represents C=O). The term "carboxylic acid" refers to a —C(O)OH group. A "carboxylate" refers to the formula —C(O)O$^-$. The term "ester" refers to the formula —OC(O)R or —C(O)OR, where R can be an alkyl, halogenated alkyl, alkoxy, alkenyl, alkynyl, aryl, heteroaryl, cycloalkyl, cycloalkenyl, heterocycloalkyl, or heterocycloalkenyl. The term "ether" refers to the formula $R_1OR_2$, where $R_1$ and $R_2$ can be, independently, an alkyl, halogenated alkyl, alkoxy, alkenyl, alkynyl, aryl, heteroaryl, cycloalkyl, cycloalkenyl, heterocycloalkyl, or heterocycloalkenyl. The term ether also includes polyether where "polyether" refers to the formula X—(OR)$_n$—Y. The term "ketone" refers to a $R_x(CO)R_y$ group, where $R_x$ and $R_y$ can each independently be an alkyl, halogenated alkyl, alkoxy, alkenyl, alkynyl, aryl, heteroaryl, cycloalkyl, cycloalkenyl, heterocycloalkyl, or heterocycloalkenyl, bound to the (CO) group through carbon-carbon bonds. The term "amine" or "amino" refers to a NRaRbRc group, where Ra, Rb, and Rc can each independently be hydrogen, an alkyl, halogenated alkyl, alkoxy, alkenyl, alkynyl, aryl, heteroaryl, cycloalkyl, cycloalkenyl, heterocycloalkyl, or heterocycloalkenyl.

The term "hydroxyl" refers to an —OH group. The term "carboxylic acid" refers to a —(CO)OH group. The term "halide" refers to the halogens fluorine, chloride, bromine, and iodine. The term "nitro" refers to the formula —NO$_2$. The term "silyl" refers to the formula —SiR$_1$R$_2$R$_3$, where R$_1$, R$_2$, and R$_3$ can be, independently, hydrogen, alkyl, halogenated alkyl, alkoxy, alkenyl, alkynyl, aryl, heteroaryl, cycloalkyl, cycloalkenyl, heterocycloalkyl, or heterocycloalkenyl Specific examples of quaternary organic cations include, but are not limited to tributly(methyl)phosphonium, tetrabutylphosphonium, tributyl-8-hydroxyoctylphosphonium, tetrapentylphosphonium, tetrahexylphosphonium, tetraoctylphosphonium, octyl(tributyl)phosphonium, tetradecyl (tributyl)phosphonium, tetradecyl(trihexyl)phosphonium, tributyl(methyl)ammonium, tetrabutylammonium, tetrapentylammonium, tetrahexylammonium, tetraoctylammonium, tetradecyl(tributyl)ammonium, tetradecyl(trihexyl)ammonium, dimethyl dicoco quaternary ammonium, stearamidopropyldimethyl-2-hydroxyethylammonium, ethyl(tetradecyldiundecyl)ammonium, tallowalkyltrimethyl ammonium, N,N,N-trimethyl-1-dodecanamonium, benzyldimethylcocoalkylammonium, N,N-dimethyl-N-dodecylglycine, butylmethylpyrrolidinium, 1-octyl-2,3-dimethylimidazolium, 1-butyl-3-methylimidazolium, sulfonium and guanidinium. It is noted that the term "coco" refers to the alkyl group derived from the mixture of fatty acids found in coconut oil, which are generally saturated fats with about 12 carbon atoms. Preferred cations are phosphonium, ammonium, pyrrolidinium and imidazolium.

The cation of the organic salt is typically associated with an anionic counterion or anion. One of ordinary skill in the art will recognize that any anion may be utilized in the organic salt disclosed herein. Examples of suitable anions include inorganic anions and organic anions. The anion may be a chaotropic anion or a kosmotropic anion. In general, chaotropic anions are "water de-structuring" anions, meaning that water molecules do not arrange in a particular order around the salt, whereas kosmotropic anions are "water structuring" anions, meaning that water molecules will order around the salt in a particular manner.

Examples of suitable anions include, but are not limited to, halide (e.g., fluoride, chloride, bromide, iodide), hydroxyl, alkylsulfate (e.g., methylsulfate, ethylsulfate, octylsulfate), dialkylphosphate, sulfate, nitrate, phosphate, sulfite, phosphite, nitrite, hypochlorite, chlorite, chlorate, perchlorate, carbonate, bicarbonate, carboxylate (e.g., formate, acetate, propionate, butyrate, hexanoate, fumarate, maleate, lactate, oxalate, pyruvate), bis(trifluoromethylsulfonyl)imide ([NTF$_2$]$^-$), tetrafluoroborate, and hexafluorophosphate, CN$^-$, SCN$^-$, OCN$^-$, as well as any of the anions described here after.

The group of halides and halogen-comprising compounds include, but are not limited to: F$^-$, Cl$^-$, Br$^-$, I$^-$, BF$_4^-$, ClO$_3^-$, ClO$_4^-$, BrO$_3^-$, BrO$_4^-$, IO$_3^-$, IO$_4^-$, PF$_6^-$, AlCl$_4^-$, Al$_2$Cl$_7^-$,

$Al_3Cl_{10}^-$, $AlBr_4^-$, $FeCl_4^-$, $BCl_4^-$, $SbF_6^-$, $AsF_6^-$, $ZnCl_3^-$, $SnCl_3^-$, $CuCl_2^-$, $CF_3SO_3^-$, $(CF_3SO_3)_2N^-$, $CF_3CO_2^-$, $CCl_3CO_2^-$.

The following includes definitions of various anions. Where formulae are provided, "R" groups have the same definition as given above. The group of sulfates, sulfites and sulfonates include, but are not limited to: $SO_4^{2-}$, $HSO_4^-$, $SO_3^{2-}$, $HSO_3^-$, $R_1OSO_3^-$, $R_1SO_3^-$. The group of nitrates and nitrites include: $NO_3^-$, $NO_2^-$. The group of phosphates include, but are not limited to: $PO_4^{3-}$, $HPO_4^{2-}$, $H_2PO_4^-$, $R_1PO_4^{2-}$, $HR_1PO_4^-$, $R_1R_2PO_4^-$. The group of phosphonates and phosphinates include, but are not limited to: $R_1HPO_3^-$, $R_1R_2PO_2^-$, $R_1R_2PO_3^-$. The group of phosphites include, but are not limited to: $PO_3^{3-}$, $HPO_3^{2-}$, $H_2PO_3^-$, $R_1PO_3^{2-}$, $RHPO_3^-$, $R_1R_2PO_3^-$.

The group of phosphonites and phosphinites include, but are not limited to: $R_1R_2PO_2^-$, $R_1HPO_2^-$, $R_1R_2PO^-$, $R_1HPO^-$. The group of carboxylic acids are of the general formula $R_1COO^-$, e.g. formate, acetate, propionate, butylate, hexanoate, fumerate, malate, lactate, oxalate, pyruvate. The group of borates include, but are not limited to: $BO_3^{3-}$, $HBO_3^{2-}$, $H_2BO_3^-$, $R_1R_2BO_3^-$, $R_1HBO_3^-$, $R_1BO_3^{2-}$, $B(OR_1)(OR_2)(OR_3)(OR_4)$, $B(HSO_4)^-$, $B(R_1SO_4)^-$. The group of boronates include, but are not limited to: $R_1BO_2^{2-}$, $R_1R_2BO^-$. The group of carbonates and carbonic esters include, but are not limited to: $HCO_3^-$, $CO_3^{2-}$, $R_1CO_3^-$. The group of silicates and salicic esters include, but are not limited to: $SiO_4^{4-}$, $HSiO_4^{3-}$, $H_2SiO_4^{2-}$, $H_3SiO_4^-$, $R_1SiO_4^{3-}$, $R_1R_2SiO_4^{2-}$, $R_1R_2R_3SiO_4^-$, $HR_1SiO_4^{2-}$, $H_2R_1SiO_4^-$, $HR_1R_2SiO_4^-$.

The group of alkylsilane and arylsilane salts include, but are not limited to: $R_1SiO_3^{3-}$, $R_1R_2SiO_2^{2-}$, $R_1R_2R_3SiO^-$, $R_1R_2R_3SiO_3^-$, $R_1R_2R_3SiO_2^-$, $R_1R_2SiO_3^-$.

The group of carboximides, bis(sulfonyl)imides and sulfonylimides include, but are not limited to:

Carboximide    bis(sulfonyl)imide    Sulfonylimide

The group of alkoxides and aryloxides of the general formulae: $R_1O^-$. The group of complex metal ions such as $Fe(CN)_6^{3-}$, $Fe(CN)_6^{4-}$, $MnO_4^-$, $Fe(CO)_4^-$.

The organic salt may include any pairing of any of the quaternary organic cations and anions described herein or generally known in the art. Examples of suitable organic salts include, but are not limited to, AMMOENG 101®, AMMOENG 110® manufactured by Solvent Innovation, Cologne, Germany, tetradecyl(trihexyl) phopshonium chloride (Cyphos IL 101®, Cytec Industries, Inc. Woodland Park, N.J.), tetrabutylphosphonium chloride (Cyphos IL 164®, Cytec Industries, Inc. Woodland Park, N.J.), tetradecyl(tributyl)phosphonium chloride (Cyphos IL 167®), 1-butyl-3-methylimidazolium chloride ([$C_4$mim]Cl), tetrabutylammonium hydroxide ([$(C_4)_4$N][OH]), tetrabutylammonium chloride ([$(C_4)_4$N]Cl), tributylmethylammonium hydroxide ([$(C_4)_3(C_1)$N][OH]), tetrapentylammonium hydroxide ([$(C_5)_4$N][OH]), Adogen 462® (dimethyl dicoco quaternary ammonium chloride), offered by Sherex Chemical Company, Dublin Ohio, Cyastat SN® (Stearamidopropyldimethyl-2-hydroxyethylammonium nitrate) manufactured by Cytec Industries, Inc. W. Paterson, N.J., ethyltetradecyldiundecyl ammonium chloride, Arquad T-50® (Tallowalkyltrimethyl ammonium chloride), manufactured by Akzo Nobel, Chicago, Ill., tetrahexylammonium bromide, butylmethylpyrrolidinium bis(trifluoromethylsulfonyl)imide, Arquad 12-50H® (N,N,N-Trimethyl-1-dodecanaminium chloride), Arquad DMCB-80® (Benzyldimethylcocoalkylammonium chloride), EMPIGEN BB® detergent (N,N-dimethyl-N-dodecylglycine) manufactured by Albright and Wilson, UK, 1-Octyl-2,3-dimethylimidazolium chloride, 10 wt % tetrabutylammonium hydroxide dissolved in PEG 900, Aliquat® HTA-1 manufactured by Cognis Corp. Tucson, Ariz., tributyl-8-hydroxyoctylphosphonium chloride, octyl(tributyl) phosphonium chloride, octyl(tributyl)phosphonium hydroxide, and tetrabutylphosphonium hydroxide.

AMMOENG 101® is represented by the following formula:

AMMOENG 110® is represented by the following formula:

ADOGEN 462® is represented by the following formula:

$R = C_{12}$-$C_{14}$

The organic salts disclosed herein may be utilized as an extractant to remove, or otherwise extract, impurities from an industrial process stream. The term "impurities" as used herein refers to compounds of interest to a user or compounds that may contaminate an industrial process stream. Impurities include, but are not limited to, organic species and/or inorganic species. Specific impurities include, but are not limited to oxalate, formate, acetate, humates, and humate decomposition products, fluoride, chloride, bromide, phosphate, metals, sulfate, gallium oxides and/or gallium hydroxides, and combinations thereof.

Examples of industrial process streams in which the organic salts may be used, include, but are not limited to, a Bayer process stream, a nuclear waste stream, high ionic strength systems such as brines, effluents from mining operations, and the like.

In general terms, the methods described herein are liquid/liquid extractions that involve extracting impurities from an industrial process stream by intermixing with an extractant that is at least partially immiscible with the industrial process stream, then separating the resultant phases. In an embodiment, impurities are extracted from a Bayer process stream. A Bayer process stream is a liquid stream generated during the Bayer process and includes the various Bayer process streams mentioned above, including thickener overflow, pregnant liquor, spent liquor and strong liquor streams. While removal of impurities from a Bayer process stream is discussed in detail herein, it should be appreciated that the method(s) discussed herein can be applied and utilized with other industrial process streams.

It has been found that an organic salt solution that includes an impurity-extracting amount of an organic salt as discussed in detail above may be highly effective for removing impurities from an industrial process stream. In a specific embodiment, when employed in the Bayer process, the methods described herein may be implemented in the form of an impurity removal unit operation that is added to the Bayer process at any point after thickener through to digestion, with the preferred location being directly after the final alumina trihydrate precipitation stage.

In one embodiment, when an organic salt solution including an impurity-extracting amount of an organic salt is intermixed with a Bayer process stream, impurities are removed from the Bayer process stream and the caustic ($OH^-$) concentration may be increased in the Bayer liquor through anion exchange during the impurity extraction, which creates additional economic benefit to the end-user. For example, water may be removed from the Bayer process stream and may be extracted into the phase containing the organic salt, particularly when the organic salt is associated with significant amounts of hydroxide anions. The phases can then be separated, thereby reducing the level of water in the Bayer process stream.

One embodiment includes a method of purifying an industrial process stream by providing an organic salt solution that includes an impurity-extracting amount of an organic salt and intermixing the industrial process stream with the organic salt solution to form a biphasic mixture. The organic salt solution is at least partially immiscible with the industrial process stream.

The resulting biphasic mixture may be a liquid/liquid biphasic mixture or a solid/liquid biphasic mixture depending on the organic salt and the impurities present in the industrial process stream. In one embodiment, the biphasic mixture contains a primarily industrial process stream phase and a primarily organic salt solution.

The intermixing of the organic salt solution with the industrial process stream is effective to reduce the concentration of impurities present in the industrial process stream. Reduction of the concentration of the impurities present in the industrial process stream results in the formation of a phase containing an impurity-loaded organic salt solution and a phase containing an impurity reduced industrial process stream.

For example, in an embodiment in which the organic salt is tetrabutylammonium hydroxide, about 48.2 weight percent of oxalate/succinate and about 85.6, 91.7, and 96.1 weight percent of acetate, formate, and chloride ions, respectively may be removed from a Bayer liquor. The total organic carbon content (TOC) may be reduced by about 63.0 weight percent in Bayer liquor. Also, a strong visual reduction in the color of the Bayer liquor after contact with the organic salt solution having an impurity-extracting amount of an organic salt may be observed. In another embodiment in which the organic salt is tetrabutylphosphonium hydroxide, about 53.38 weight percent of oxalate/succinate, and 83.93, 91.93, 96.48 weight percent of acetate, formate, and chloride ions, respectively, may be removed from the Bayer liquor. The TOC content in the Bayer liquor may be reduced by about 67.7 weight percent.

This invention is not bound by theory of operation, but it is believed that removal (extraction) of impurities (such as oxalate) from the industrial process stream into the organic salt solution with which it is intermixed is facilitated by the mixing conditions and the presence of the organic salt in the organic salt solution. It is contemplated that the intermixing of the industrial process stream with the organic salt solution may remove one or more impurities present in the industrial process stream. The impurities removed from the industrial process stream will depend on a variety of factors, including but not limited to, impurities present in the industrial process stream, organic salt present in the organic salt solution, the ratio of salt solution to industrial process stream, and the like.

In an embodiment, the organic salt solution includes an impurity-extracting amount of an organic salt. In a specific example, the impurity-extracting amount is an oxalate-extracting amount of an organic salt. The impurity-extracting amount of organic salt may be determined by routine experimentation informed by the guidance provided herein. The impurity-extracting amount of organic salt present in the organic salt solution may vary from application to application. In one example, the organic salt is present in the organic salt solution in an amount of about 2% or greater by weight based on total weight of the organic salt solution. In another example, the organic salt is present in the organic salt solution in an amount of about 3% or greater by weight based on total weight of the organic salt solution. In yet another example, the organic salt is present in the organic salt solution in an amount from about 5% or greater by weight based on total weight of the organic salt solution. In a further example, the organic salt is present in the organic salt solution in an amount from about 3% to about 100% by weight based on total weight of the organic salt solution. When the method according to the invention is applied to the Bayer process, the impurity-extracting amount of organic salt is preferably at least about 1% by weight, more preferably at least about 10% by weight, based on the weight of the Bayer process stream.

In one embodiment, the organic salt solution may be an aqueous solution containing a certain amount of water. When the organic salt solution is an aqueous solution, the organic salt is preferably present in the organic salt solution in an amount of 30% or greater by weight based on the total weight of the organic salt solution. In another embodiment, when the organic salt solution is an aqueous solution, the organic salt is more preferably present in the organic salt solution in amount of 50% or greater by weight based on the total weight of the aqueous organic salt solution. The amount of water present in the aqueous organic salt solution will vary depending on the application, and may be determined by routine experimentation informed by the guidance provided herein. For example, in one embodiment the aqueous organic salt solution comprises from about 20% to about 80% water, by weight based on total weight of the aqueous organic salt solution.

In another embodiment, the organic salt solution may contain diluents such as alcohols (e.g., isopropanol), polyols and/or polyethyleneoxide. Such diluents may facilitate phase separation. The amount of diluents present in the organic salt solution varies from application to application. In one example, the organic salt solution includes from about zero (0) to about 90% by weight of diluents based on total weight of organic salt solution. In another example, the organic salt solution includes from about zero (0) to about 70% by weight of diluents based on total weight of organic salt solution.

The organic salt solution may also include a solvent. Solvents useful in the organic salt solution include, but are not limited to, aromatic hydrocarbons, some examples of which include toluene, benzene and derivatives thereof and light aromatic hydrocarbon oil (SX-12); aliphatic alcohols, some examples of which include 1-hexanol, 1-heptanol, 1-octanol and their respective derivatives; aromatic alcohols, examples of which include phenol and derivatives; and halogenated hydrocarbons, examples of which include methylene chloride and chloroform. The organic salt solution may also include phosphine oxides. The amount of solvents present in the organic salt solution varies from application to application. In one example, the organic salt solution includes from about zero (0) to about 90% by weight of solvents based on total weight of organic salt solution. In another example, the organic salt solution includes from about zero (0) to about 70% by weight of solvents based on total weight of organic salt solution.

Figure 1:
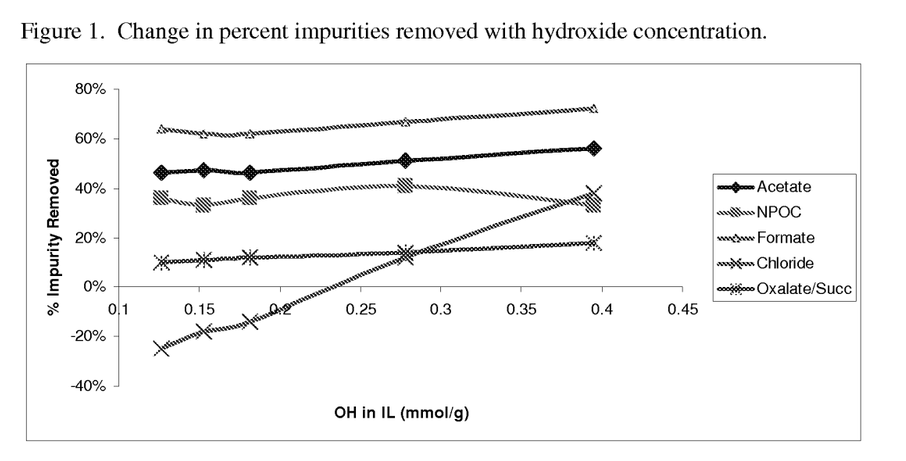
FIG. 1 is a chart illustrating impurity removal changes as the level of hydroxide changes in the phase containing the organic salt.

In some embodiments, the organic salt present in the organic salt solution may be subjected to a pre-extraction treatment, often referred to as equilibration. A variety of methods can be utilized to achieve this treatment which results in at least a portion of the cationic portion of the organic salt having a preferred counter anion, for example, hydroxide as a counter anion. FIG. 1 illustrates how impurity removal changes as the level of hydroxide changes in the phase containing the organic salt. For instance, the removal of chloride increases as the level of hydroxide present in the organic salt increases.

For example, pre-extraction Method 1 may be conducted by vigorously mixing a NaOH solution, e.g. a 26% NaOH solution, with the organic salt in a ratio in the range of about 1 part organic salt to 4 or 5 parts NaOH solution, by weight. The resulting mixture is then allowed to phase separate for 20 minutes. The upper phase containing the organic salt is then separated and again contacted with fresh NaOH solution in a [1:4] mass ratio. This process may be repeated up to 4 or 5 times. This procedure exchanges the majority of the counter anion for OH$^-$ and pre-equilibrates the water potential to minimize any transfer of water between the aqueous organic salt solution containing the organic salt and the industrial process stream.

Pre-extraction Method 2 is conducted in a manner similar to Method 1, except that the ratio of organic salt to NaOH solution is about [1:2] by weight. Pre-extraction Method 3 is similar to Method 2, except that the organic salt is dissolved in polyethyleneglycol prior to mixing with the NaOH solution and the process is repeated 2 times instead of 4-5. Pre-extraction Method 4 is similar to Method 2, except that the organic salt is dissolved in a solvent prior to mixing with the NaOH solution and the process is repeated 2 times instead of 4-5.

In Pre-extraction Method 5, the organic salt can be used for separating the impurities from the industrial process stream directly as received without contacting it with NaOH. During this process, there may be some water transport between the two phases which can be later accounted for. Also, some ion exchange typically takes place between the anionic species in the industrial process stream and the quaternary organic cation counter anion, the rate and extent of which will depend upon the anion type in competition for exchange.

Pre-extraction Method 6 is conducted equilibrating an organic salt with a $NaHCO_3$ slurry. In this method, equal parts of an organic salt solution and a $NaHCO_3$ slurry, e.g., a 20% $NaHCO_3$ slurry, is stirred rapidly at 60° C. The mixture is allowed to phase separate. The lower $NaHCO_3$ phase is drained off and a fresh amount of 15% $NaHCO_3$ is added. The mixture is stirred for and the phases are allowed to separate. The lower $NaHCO_3$ phase is drained off and the upper equilibrated organic salt solution is saved for further use.

The amount of organic salt solution intermixed with the industrial process stream is typically an amount that is effective to form a biphasic mixture. In one embodiment the biphasic mixture includes a phase containing an impurity-loaded organic salt solution and a phase containing an impurity reduced industrial process stream. By "impurity-loaded" it is meant that the organic salt has an impurity complexed or associated therewith. The "complexing" or "association" of the impurity to the organic salt occurs during the intermixing of the organic salt solution and the industrial process stream and the interaction between the same.

Although the organic salt solution is at least partially immiscible with the industrial process stream, the degree of miscibility may vary, and thus the relative amounts of organic salt solution and industrial process stream that are intermixed may vary over a relatively broad range. Factors that tend to influence miscibility include, but are not limited to, temperature, the salt content of the industrial process stream, organic salt content of the organic salt solution, and various characteristics of the organic salt itself, such as molecular weight and chemical structure.

Useful mass ratios of organic salt solution to industrial process stream that are effective to form biphasic mixtures are typically in the range of about [1:100] to about [1:0.01] by weight. In another embodiment, the weight ratio of organic salt solution to industrial process stream is between about [1:10] to about [1:0.1]. In yet a further embodiment, the weight ratio of organic salt solution to industrial process stream is between about [1:4] to about [1:0.15]. In a further embodiment, the weight ratio of organic salt solution to industrial process stream is about [1:2] to about [1:0.25]. Routine experimentation informed by the guidance provided herein may be used to identify relative amounts of organic salt solution and industrial process stream that are effective to form biphasic mixtures.

The industrial process stream and the organic salt solution can be intermixed in various ways, e.g., by batch, semi-continuous or continuous methods. In one embodiment, the process is a continuous process.

The intermixing can be accomplished by feeding the industrial process stream and the organic salt solution into any suitable equipment that can be used for mixing and phase separation or settling. Examples of mixing and phase separation or settling equipment that may be suitable in particular situations may include, but is not limited to, continuous mixer/settler units, static mixers, in-line mixers, columns, centrifuges, and hydrocyclones. Routine experimentation informed by the guidance provided herein may be used to identify and select suitable equipment and operating conditions for particular situations.

In the present invention, extraction and stripping may be carried out in mixer settlers, columns, centrifuges, static mixers, reactors or other suitable contacting/separation equipment. The flowsheet may contain one or more extraction stages, one or more stripping stages, and may or may not include wash/scrub stages to remove impurities and reduce entrainment contamination. The extraction plant can be configured for series, modified-series, series parallel, modified series parallel, parallel, or interlaced series parallel operation for each section of the solvent extraction ("SX") circuit (i.e. extraction section, scrub/wash section, and the stripping section). Alternatively, the extraction, scrubbing and stripping stages may be done on a batch basis.

The biphasic mixture, formed by intermixing of the organic salt solution with the industrial process stream, includes a phase containing an impurity-loaded organic salt solution and a phase containing an impurity reduced industrial process stream. Although the industrial process stream and the organic salt solution may be mutually soluble to some extent (and thus each may contain small amounts of the other after intermixing), the two phases are at least partially immiscible with one another and thus the resulting phase containing the industrial process stream will typically resemble the parent industrial process steam, although it will generally contain lower amounts of impurities (such as organic content (referred to as TOC), oxalate, and the like) and/or water, as described herein Likewise the phase containing the impurity-loaded organic salt will typically resemble the parent organic salt solution, although it will generally contain higher amounts of impurities (such as oxalate and the like) and/or water, as described herein.

The impurity-loaded organic salt solution contains, among other things, an impurity-loaded organic salt. The amount of impurity-loaded organic salt present in the impurity-loaded organic salt solution will vary depending on the application, as well as the amount of impurities removed from the industrial process stream. In one example, the amount of impurity-loaded organic salt present in the impurity-loaded organic salt solution is 1% by weight or greater based on the weight of the impurity-loaded organic salt solution.

In one embodiment, as a result of the extraction methods described herein, the impurity reduced industrial process stream has a reduced level of at least one impurity present in the parent industrial process stream. In an embodiment, the impurity reduced industrial process stream phase has a lower level of at least one impurity selected from oxalate, formate, acetate, organic carbon, and chloride, as compared to the parent industrial process stream. In another embodiment, the impurity reduced industrial process stream phase has a lower level of water, as compared to the parent industrial process stream.

The impurity reduced industrial process stream and the impurity-loaded organic salt solution can be utilized in different manners. For instance, the impurity reduced industrial process stream may be introduced to the industrial process it was originally taken from, or it may be discarded. Alternatively, the impurity reduced industrial process stream may be subjected to further processing.

The impurity-loaded organic salt solution may be subjected to further processing in order to regenerate and subsequently re-utilize the organic salt present therein. Alternatively, the impurity-loaded organic salt solution may be intermixed with another industrial process stream to remove impurities therefrom.

To utilize the impurity-loaded organic salt solution or the impurity reduced industrial process stream, separation of the phases may be necessary. Separation of the impurity-loaded organic salt solution from the impurity reduced industrial process stream forms a separated impurity-loaded organic salt solution and a separated impurity reduced industrial process stream.

Separation can be conducted in a variety of manners. For example, the mixing apparatus may be configured to readily allow formation of the biphasic mixture (i.e., phase separation) as well as physical separation of the phases to be accomplished. For example, the biphasic mixture may be formed in a mixing tank having take-off valves at the top and bottom. After mixing is stopped, the impurity-loaded organic salt solution separates from the impurity reduced industrial process stream and each of the layers is drawn off from the mixing tank by the respective top and bottom take-off valves. It is not necessary for mixing to completely stop, as each of the phases may tend to form in respective areas of the tank even during mixing.

In an embodiment, the phase separation rate of the impurity reduced industrial process stream from the impurity-loaded organic salt solution can be enhanced. For example, the separation rate can be enhanced by heating. Heating can be accomplished in various ways. For example, the biphasic mixture may be heated in the mixing tank itself, and transferred to another tank for heating (and optionally for separation). Methods of heating include heat exchangers, which may be used to advantageously capture excess heat from other sources. Examples of heat exchangers include shell and tube heat exchangers, plate heat exchangers, regenerative heat exchangers, adiabatic wheel heat exchangers, fluid heat exchangers and dynamic scraped surface heat exchangers.

Use of a heat exchanger may allow the temperature of the biphasic mixture to be maintained at a particular temperature or raised to a desired temperature, e.g., by heating so as to raise the temperature to a maximum of about 100° C. The rate of separation can be controlled by regulating the temperature of the biphasic mixture as it undergoes separation. This may increase the effectiveness of impurity removal from the industrial process stream.

The separated, impurity reduced industrial process stream phase may be introduced to the process from which it was taken. In one embodiment, the separated, impurity reduced industrial process stream phase can be intermixed with a second industrial process stream. This may be done for various reasons, e.g., when utilized in the Bayer process it may maximize the efficiency of the overall process, which is generally continuous. Thus, the methods described herein may be applied to purify a selected portion of a parent industrial process stream and then the resulting impurity reduced industrial process stream may be re-introduced back into the parent industrial process stream, thereby lowering the level of impurities in the parent industrial process stream by dilution.

In another embodiment, when impurities are removed from a Bayer process stream, the separated impurity reduced industrial process stream can be cooled to precipitate at least a portion of aluminum hydroxide and/or oxalate dissolved therein. Cooling of the separated impurity reduced industrial process stream can be accomplished in a variety of ways. For example, the heat exchangers mentioned above in the context of heating the biphasic mixture can also be used to remove heat from the separated impurity reduced industrial process stream and/or the industrial process stream into which it is introduced, thereby cooling the liquor. Heat exchangers can be placed in at any location in the plant where it is desired to cool the Bayer process liquor.

The impurity-loaded organic salt solution, i.e., the separated impurity-loaded organic salt solution, may be subjected to further processing to regenerate the organic salt, or may be subjected to testing to determine the amount and type of impurities present therein, or may be reutilized as an extractant in another industrial process stream, or a combination thereof.

In one embodiment, the impurity-loaded organic salt solution includes a quaternary organic cation and at least one organic impurity selected from oxalate, formate, acetate, and organic carbon. The amount of organic impurity may vary over a broad range, e.g., the amount of organic impurity is in the range of about 0.0001% to about 5%, by weight based on total weight of impurity-loaded organic salt solution. The amount of organic salt present in the impurity-loaded organic salt solution may be similar to that described elsewhere herein for use in the methods described herein. Even though the impurity-loaded organic salt solution contains one or more impurities, it may still be useful as an extractant in situations in which it contains a lower level of impurities.

In an embodiment, the impurity-loaded organic salt solution may be a separated phase that contains an organic impurity, an inorganic impurity and/or additional water, as a result of the extraction from the Bayer process stream as described herein. For example, in an embodiment, the impurity-loaded organic salt solution contains oxalate and at least one organic impurity selected from formate, acetate, organic carbon, fluoride, chloride, bromide, sulfate, phosphate, and other metal ions. The impurity-loaded organic salt solution may contain various amounts of impurities, depending on the extent of extraction and the level of impurities in the industrial process stream. In some cases the level of impurities in the impurity-loaded organic salt solution is relatively low, such that the impurity-loaded organic salt solution can be used as an extractant in the manner described herein.

Amounts of anionic impurities present in the impurity-loaded organic salt solution may be determined using anion exchange ion chromatography methods with conductivity detection. Two alternative ion chromatography (IC) methods may be used, the isocratic method and the gradient method, as follows:

Ion chromatography for oxalate quantification ("isocratic method"): Samples are diluted 125-fold with deionized (DI) water and then filtered with PALL Acrodisc 0.2 μm×13 mm PVDF syringe filter into Agilent PP vials with snap caps for chromatographic separation. Oxalate in the samples is separated from its matrix as a single chromatographic peak using a Dionex IonPac AS4A-SC column (250×4.0 mm, part #043174), a guard column (Dionex IonPac AG4A-SC part #043175), mobile phase of 3.5 mM $NaCO_3$ and 1.7 mM $NaHCO_3$, a Dionex ASRS-ULTRAII 4 mm anion self-regenerated suppressor, and conductivity detection. Detailed instrument conditions are as follows.

| System: | Dionex ICS-3000 gradient pump system (system 1) |
|---|---|
| Column: | Dionex Ionpac AS4A-SC column, 250 × 4.0 mm, part #043174 |
| Guard column: | Dionex IonPac AG4A-SC part #043175. |
| Mobile phase: | 3.5 mM $NaCO_3$ and 1.7 mM $NaHCO_3$ |
| Flow rate: | 1.5 ml/min |
| Run time: | 20 min |
| Injection volume: | 25 μL |
| Column temperature: | 35° C. on DX-500; 30° C. on ICS-3000 system 1. |
| ASRS current: | 50 mA with recycle mode |
| Conductivity detector: | 35° C. with temp compensation 1.7% ° C. |
| Data collection Rate: | 5.0 Hz |
| Software: | Dionex Chromeleon software version 6.70 |

Quantitative results for the isocratic method are obtained by comparing the oxalate peak sizes from the sample and oxalate standard solution. Oxalate standard material from Acros Organic is dissolved in DI water and diluted to several concentration levels. The detection responses of the standard solutions analyzed parallel to the samples are plotted against their concentrations. A linearity concentration range of this plot is set up as working range. Sample quantification is based on the linear line slope. The method has a relative standard deviation (RSD) about 1.7% and the instrument precision is about 0.4%. Limit of Detection is 0.2 ppm of sodium oxalate.

The "gradient method" is used for the analyses of acetate, formate, chloride, sulfate, phosphate and oxalate/succinate anions. It should be noted that oxalate and succinate anions coelute in this method. Samples are diluted 125-fold with DI water and then filtered with PALL Acrodisc 0.2 μm×13 mm PVDF syringe filter into Agilent PP vials with snap caps for chromatographic separation. The specified anions are separated and detected using Dionex ICS-3000 Reagent-Free Ion Chromatography (RFIC) system with a Dionex IonPac AS19 column, potassium hydroxide gradient eluent, a Dinoex ASRS-ULTRAII 4 mm anion self-regenerated suppressor, and conductivity detector. To quantitatively determine the anion contents in the samples, external standards with varying concentrations are used to establish the correlation between the concentration and the detector response. Oxalate standard material is obtained from Acros Organic and the others are purchased from Inorganic Ventures. The correlation relationship for the organic anions becomes non-linear (curve up) when the concentration is higher than 50 ppm (mg/L) and that acetate has the narrowest linear range. Therefore, the concentrations of the organic external standards used for quantification are calibrated with respect to the anions concentrations in the samples to account for the non-linear affect, especially for obtaining accurate data in mass balance between Bayer liquor and the removing extractant.

Detailed instrument conditions are as follows.

| DIONEX ICS-3000 system 2 with KOH Eluent Generator | |
|---|---|
| Column: | DIONEX IonPac AS19, 250 × 4.0 mm |
| Guard column: | DIONEX IonPac AG19 |
| Column temperature: | 30° C. |
| Ion Suppressor: | DIONEX ASRS-ULTRA II, 4 mm; re-cycles; 114 mA. |
| Detection: | Conductivity detector with temperature compensation 1.7% ° C. |
| Collection Rate: | 5.0 Hz |
| Injection: | 25 μL |
| Flow rate: | 1.0 mL/min. |
| Run time: | 30 minutes including post times. |
| Mobile phase: | KOH gradient |

| Gradient: | Time (min) | KOH mM |
|---|---|---|
| | 0 | 10 |
| | 3 | 10 |
| | 25 | 50 |
| | 25.1 | 10 |
| | 30 | 10 |

| Software: | Dionex Chromeleon software version 6.70 |
|---|---|

The instrument precision is 0.7% relative standard deviation (RSD) or better for all the analytes. The method precision is 0.7% RSD or better for all the analytes with the exception of phosphate. For phosphate, in 6 individual determinations, its concentration is found to be less than 1 ppm and the method precision is 5.8% RSD. Finally, the Limit of Detection is 0.2 ppm (mg/L) or better for all the anions.

For both of the methods, the columns are cleaned after the analyses of 20 to 40 samples to get rid of contaminations from accumulated poly-anionic species and metals from the sample matrixes. This cleaning procedure is set up on an IC unit with programmed cleaning steps of 0.5 M sodium hydroxide, water and 2N hydrochloric acid.

The impurity-loaded organic salt solution may be discarded or subjected to further processing after an amount of impurities present in the impurity-loaded organic salt solution is determined. In one embodiment, the impurity-loaded organic salt solution may be used as an extractant in another industrial process stream. One of ordinary skill in the art will recognize that introduction of the impurity-loaded organic salt solution to another industrial process stream may occur without analysis of the impurities therein.

In another embodiment, the organic salt present in the impurity-loaded organic salt solution may be regenerated, i.e., the impurities are removed from the organic salt in order to re-utilize the organic salt as part of an extractant. Regeneration of the organic salt present in the impurity-loaded organic salt solution involves removing the impurities from the impurity-loaded organic salt. Regeneration of the organic salt includes intermixing the impurity-loaded organic salt solution with a stripping solution. While only one stripping step is discussed herein, the process is not limited in this regard as more than one stripping step may be employed. Additionally, it is contemplated that if more than one stripping step is performed, the stripping solution used during the subsequent step may be the same or different as the stripping solution utilized in the first step.

In one embodiment of removing impurities from an organic salt, the impurity-loaded organic salt solution is intermixed with a stripping solution to form a biphasic mixture. In general, the stripping solution facilitates the removal of an impurity from the impurity-loaded organic salt. For example, the stripping solution may contain a compound having an anion selected from a halide (e.g., fluoride, chloride, bromide, iodide), hydroxyl, alkylsulfate (e.g., methylsulfate, ethylsulfate, octylsulfate), dialkylphosphate, sulfate, nitrate, phosphate, sulfite, nitrite, hypochlorite, chlorite, perchlorate, carbonate, bicarbonate, carboxylate (e.g., formate, acetate, propronate, butyrate, hexanoate, fumarate maleate, lactate, oxalate, pyruvate), bis(trifluoromethylsulfonyl)imide ($[NTF_2]$), tetrafluoroborate and hexafluorophosphate.

In a specific example, the stripping solution includes a compound having a hydroxyl ($OH^-$) anion. In another example, the stripping solution includes a compound having a bicarbonate anion ($HCO_3^-$). In a further example, the stripping solution includes a compound having a chloride anion ($Cl^-$).

It is contemplated that the compound present in the stripping solution may include any cation capable of bonding with the aforementioned anions. The compound(s) present in the stripping solution may include, but are not limited to: sodium chloride, potassium bromide, sodium bisulfate, sodium hydroxide, sodium nitrate, sodium bicarbonate, sodium nitrite, and the like.

A specific example of a stripping solution capable of being intermixed with an aqueous impurity-loaded organic salt solution is a solution containing 25% (by weight) sodium chloride (25% NaCl). Another example of a stripping solution is a solution containing 15% (by weight) sodium bicarbonate (15% $NaHCO_3$). A further example of a stripping solution is a solution containing 7.5% (by weight) of sodium hydroxide (7.5% NaOH). Another example of a stripping solution is a solution containing 10% (by weight) sodium hydroxide (10% NaOH). In yet another example, the stripping solution includes 12.5% (by weight) of sodium hydroxide (12.5% NaOH).

Although the impurity-loaded organic salt solution may be at least partially immiscible with the stripping solution, the degree of immiscibility may vary, and thus the relative amounts of impurity-loaded organic salt solution and stripping solution may vary over a relatively broad range. Factors that tend to influence immiscibility include temperature, inorganic salt content, e.g. $OH^-$ content, organic salt content, and various characteristics of the organic salt itself, such as molecular weight and chemical structure.

The amount of impurity-loaded organic salt solution and stripping solution that is intermixed to form the biphasic mixture varies from application to application and is dependent on one or more factors. Factors influencing the amount of stripping solution and impurity-loaded organic salt solution include, but are not limited to the type and/or amount of organic salt and/or impurity present in the impurity-loaded organic salt solution, the anion present in the stripping solution, and the like.

In one embodiment, the mass ratio of the impurity-loaded organic salt solution to stripping solution is [1:100] to [1:0.01]. In another embodiment, the weight ratio of the impurity-loaded organic salt solution to stripping solution is [1:10] to [1:0.1]. In a further embodiment, the weight ratio of the impurity-loaded organic salt solution to stripping solution is [1:4] to [1:0.15]. In yet a further embodiment, the weight ratio of the impurity-loaded organic salt solution to stripping solution is [1:2] to [1:0.25].

The intermixing of the impurity-loaded organic salt solution and the stripping solution forms a biphasic mixture. Each of the phases of the biphasic mixture may be a liquid phase. Alternatively, one of the phases of the biphasic mixture may include a solid. The biphasic mixture includes a primarily impurity-loaded organic salt phase and a primarily stripping solution phase.

The impurity-loaded organic salt solution and the stripping solution can be intermixed in various ways, e.g., by batch, semi-continuous, or continuous methods. Similar to the intermixing of the organic salt solution with the industrial process stream, the intermixing of the impurity-loaded organic salt solution and the stripping solution can be accomplished by feeding the impurity-loaded organic salt solution and the stripping solution into any suitable equipment that can be used for mixing and phase separation or settling. In one embodiment, the intermixing comprises feeding the impurity-loaded organic salt solution and stripping solution to an in-line mixer. In another embodiment, the intermixing comprises feeding the impurity-loaded organic salt solution and stripping solution to a continuous mixer/settler unit.

The intermixing of the impurity-loaded organic salt solution and the stripping solution is effective to remove impurities from the impurity-loaded organic salt, which thereby reduces the concentration of impurities in the impurity-loaded organic salt solution. Removal of the impurities from the impurity-loaded organic salt forms an impurity reduced organic salt solution and a primarily stripping solution phase.

In general, the impurity reduced organic salt solution includes the organic salt with the impurity removed therefrom. The impurity reduced organic salt solution may also include some impurity-loaded organic salt.

After intermixing the impurity loaded salt solution with the stripping solution, the resulting phases may be separated and utilized individually. For example, the resulting primarily stripping solution phase may be discarded or re-utilized as a stripping solution. Alternatively, the primarily stripping solution may be subjected to further processing before discarded or re-utilized. It will be appreciated that the formation of the biphasic mixture and the physical separation of one phase from another may be conducted in a manner similar to the biphasic mixture formation and separation discussed above.

The resulting impurity reduced organic salt solution may be provided to an industrial process stream to be utilized as an extractant, i.e., to extract impurities from an industrial process stream. Alternatively, the impurity reduced organic salt solution may be subjected to further processing, e.g., intermixing with a wash solution.

In one embodiment, for example, when a Bayer process stream is employed as the industrial process stream, where the impurity is removed from the organic salt by intermixing the impurity-loaded organic salt solution with a stripping solution containing a compound having a hydroxyl ($OH^-$) anion, the impurity reduced organic salt solution containing the impurity-free organic salt may be provided to an industrial process stream for use as an extractant. Alternatively, if the stripping solution contains a compound having an anion other than hydroxyl ($OH^-$), the reduced-impurity organic salt solution may undergo further processing, such as intermixing with a wash solution, prior to re-utilizing the impurity-free organic salt as an extractant in an industrial process stream.

Intermixing the impurity reduced organic salt solution with a wash solution facilitates the removal of anions from the organic salt that may prohibit or prevent the ability of the organic salt to be used as an extractant in an industrial process stream. While only one wash step is discussed herein, the process is not limited in this regard as more than one wash step may be employed. Additionally, it is contemplated that if more than one wash step is performed, the wash solution used during the subsequent wash step may be the same or different as the wash solution utilized in the first wash step.

In one embodiment, the wash solution includes a compound having an anion. Examples of suitable anions include, but are not limited to, halide (e.g., fluoride, chloride, bromide, iodide), hydroxyl, alkylsulfate (e.g., methylsulfate, ethylsulfate, octylsulfate), dialkylphosphate, sulfate, nitrate, phosphate, sulfite, phosphite, nitrite, hypochlorite, chlorite, chlorate, perchlorate, carbonate, bicarbonate, carboxylate (e.g., formate, acetate, propionate, butyrate, hexanoate, fumarate, maleate, lactate, oxalate, pyruvate), bis(trifluoromethylsulfonyl)imide ($[NTF_2]^-$), tetrafluoroborate, and hexafluorophosphate.

In a specific example, the wash solution includes a compound having a hydroxyl ($OH^-$) anion. A particular example of a compound present in the wash solution is sodium hydroxide (NaOH). A specific example of a wash solution contains 7.5% NaOH. Another specific example of a wash solution contains 10% NaOH. A further example of a wash solution contains 12.5% NaOH.

The impurity reduced organic salt solution is intermixed with the wash solution to form a biphasic mixture. In one embodiment, the biphasic mixture includes a phase containing a washed organic salt and a phase containing a wash solution. The washed organic salt includes, in general, an impurity-free organic salt. The wash solution phase includes the wash solution.

The impurity reduced organic salt solution is intermixed with the wash solution in any amount that is effective to form the biphasic mixture. The amount of impurity reduced organic salt solution and wash solution that are intermixed will vary from application to application. In one example, the mass ratio of impurity reduced organic salt solution to wash solution is [1:100] to [1:0.01] by weight. In another embodiment, the weight ratio of impurity reduced organic salt solution to wash solution is [1:10] to [1:0.1] by weight. In yet a further embodiment, the weight ratio of impurity reduced organic salt solution to wash solution is [1:4] to [1:0.15] by weight. In another embodiment the weight ratio of impurity reduced organic salt solution to wash solution is [1:2] to [1:0.25].

The intermixing of the impurity reduced organic salt solution with the wash solution is effective to form a phase containing a washed organic salt. The phase including the washed organic salt generally includes a regenerated organic salt that can be provided to an industrial process stream for use as an extractant. It will be appreciated that the washed organic salt may be provided to the process from which the parent aqueous organic salt solution was added to remove impurities. Alternatively, the washed organic salt may be provided to another industrial stream in another process to remove impurities therefrom.

The remaining wash solution may either be discarded or re-utilized as a wash solution.

In one embodiment, the washed organic salt includes a quaternary organic cation and a counterion. Specifically, the washed organic salt includes a cation selected from the group consisting of phosphonium, ammonium, imidazolium, pyrrolidinium, quinolinium, pyrazolium, oxazolium, thiazolium, isoquinolinium and piperidinium. The counterion is an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ($[NTF_2]^-$), tetrafluoroborate, and hexafluorophosphate.

The following Examples illustrate certain aspects of the invention as disclosed and discussed herein. The Examples are for illustrative purposes only and are not meant to limit the invention or any of the embodiments in any way.

EXAMPLES

Example 1

Removal of Impurities from an Impurity-Loaded Organic Salt Solution Utilizing a Stripping Solution Containing Sodium Chloride An organic salt solution having 62% Octyl(tributyl)phosphonium chloride and 38% water is contacted with 10% sodium hydroxide at a mass ratio of [1:1] in a two stage counter-current mixer-settler unit. A biphasic mixture is formed. The process results in a hydroxide concentration of about 0.35 mmol/g in the organic salt solution.

The above-mentioned organic salt solution is intermixed with a Bayer process liquor at a mass ratio of [1:1] (Bayer processing liquor to organic salt solution). A countercurrent flowsheet is simulated by using small batches in laboratory separatory funnels as described in "Mass-Transfer Operations" $3^{rd}$ Edition, Robert E. Treybal, McGraw-Hill Book Company, New York, 1980 (Chapter 10). A biphasic system forms and the impurities partition between the two phases based on equilibrium values, thereby forming a phase containing an impurity-loaded organic salt solution and a phase containing a Bayer process liquor.

Figure 2:
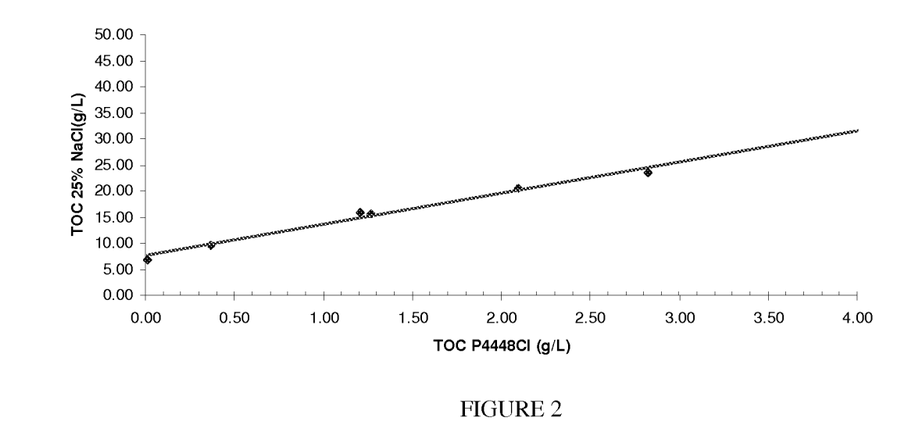
FIG. 2 is a chart illustrating partitioning of Total Organic Carbon.

The impurity-loaded organic salt solution is then contacted with a stripping solution at a mass ratio of [1:0.33] (impurity loaded organic salt solution to stripping solution) in a countercurrent flowsheet simulated by using small batches in laboratory separatory funnels. The stripping solution contains 25% sodium chloride. Impurities present in the impurity-loaded organic salt solution are removed by sodium chloride. FIG. 2 shows the partitioning of Total Organic Carbon (TOC) in each of the two phases, whereby different data points represent different mass ratios of organic salt solution to NaCl phase.

a. Equilibrate the Organic Salt

An organic salt solution containing an organic salt, such as octyl(tributyl)phosphonium chloride for example, is equilibrated with either 10% or 26% NaOH solution using the following method: for completely water miscible organic salts, the organic salt is first dissolved in deionized water (DI) to achieve a solution of about 70% w/w. An equal mass of the organic salt solution and NaOH solution are contacted in a separatory funnel. The separatory funnel is tightly sealed and placed in an oven at 60° C. for 2 hrs. The funnel is then shaken (by hand) for 2 minutes and then placed in the oven for 30 minutes. The funnel is then shaken again for 2 minutes and placed back in the oven for 1 hr to ensure the phases have fully disengaged. After 1 hour, the bottom NaOH layer is drained off and the top NaOH equilibrated organic salt phase, i.e., the organic salt solution, is saved for further use.

b. Intermixing the Organic Salt Solution with a Bayer Liquor

The organic salt solution is intermixed with Bayer liquor using the following method: equal masses of the organic salt solution and Bayer liquor are added to a separatory funnel and placed in an oven at 60° C. for 2 hrs. The funnel is then shaken (by hand) for 2 minutes and then placed in the oven for 30 minutes. The funnel is then shaken again for 2 minutes and placed back in the oven for 1 hr to ensure the phases have fully disengaged. After 1 hr, the bottom Bayer liquor phase is drained off and the top impurity-loaded organic salt solution is collected for further use.

c. Stripping Impurities from the Impurity-Loaded Organic Salt Solution using a Strip Solution Containing 25% NaCl The impurity loaded organic salt solution from above is contacted with a strip solution containing 25% NaCl. Equal masses are placed in a laboratory separatory funnel, shaken for 2 min. and then placed in an oven at 60° C. for 2 hrs. The funnel is then shaken for 2 minutes and then placed in the oven for 30 minutes. The funnel is then shaken for 2 minutes and placed back in the oven for 1 hr to ensure the phases have fully disengaged. The phases are then separated and analyzed. Concentrations of oxalate/succinate, acetate, and formate are determined using ion chromatography (IC) (gradient method) and provided in Table 1 below.

TABLE 1

Average percent (ave. %) impurity removed from the impurity loaded organic salt solution using a 25% NaCl strip solution

| Initial organic salt used (before equilibrating) | Ave. % Ox/Succ removed | Ave. % Acetate removed | Ave. % Formate removed |
| --- | --- | --- | --- |
| Ammoeng-110 | 69.31 | 71.72 | 62.69 |
| Ammoeng-101 | 83.94 | 85.36 | 72.43 |
| 1-butyl-3-methylimidazolium chloride | 76.04 | 100* | 0 |
| 1-butyl-2,3-dimethylimidazolium chloride | 60.85 | 75.22 | 52.25 |
| Butylmethylpyrolidinium bromide | 81.68 | 85.58 | 53.21 |
| Octyl(tributyl)phosphonium chloride | 59.46 | 98.42 | 93.12 |
| Tetrabutylphosphonium hydroxide | 100* | 100* | 78.19 |
| Tetrabutylammonium hydroxide | 100* | 89.58 | 70.03 |
| Octyl(tributyl)ammonium chloride | 89.85 | 100* | 100* |
| Octyl(trihexyl)phosphonium chloride | 11.27 | 73.23 | 52.2 |
| Trihexyl(butyl)phosphonium chloride | 4.64 | 53.2 | 44.53 |
| Tetradecyl(tributyl)ammonium chloride | 44.04 | 100* | 92.48 |
| Tetradecyl(trihexyl)phosphonium bromide | 2.74 | 17.67 | 10.31 |
| Tetrahexylammonium chloride | 9.7 | 86.8 | 63.68 |
| Hexyl(tributyl)phosphonium chloride | 51.74 | 100* | 89.25 |

*Impurity below instrument detection limit in the organic salt phase, assumed 100% removal Example 2

Removal of Impurities from an Impurity-Loaded Organic Salt Solution Utilizing a Stripping Solution Containing Sodium Bisulfate, Sodium Nitrate, or Sodium Nitrite a. Equilibrating the Organic Salt An organic salt solution containing an organic salt, such as octyl(tributyl)phosphonium chloride as an example, is equilibrated with either 10% or 26% NaOH solution using the following method: for completely water miscible organic salts, the organic salt is first dissolved in deionized water (DI) to achieve an organic salt solution of about 70% organic salt.

An equal mass of the organic salt solution and NaOH solution are contacted in a 500 mL separatory funnel (200 g each). The separatory funnel is tightly sealed and placed in an oven at 60° C. for 2 hrs. The funnel is then shaken (by hand) for 2 minutes and then placed in the oven for 30 minutes. The funnel is then shaken again for 2 minutes and placed back in the oven for 1 hr to ensure the phases have fully disengaged. After 1 hr. the bottom NaOH layer is drained off and the top NaOH equilibrated organic salt phase, i.e., the organic salt solution, is saved for further use.

b. Intermixing the Aqueous Organic Salt Solution with a Bayer Liquor

The organic salt solution is intermixed with Bayer liquor using the following method: equal masses (200 g) of the organic salt solution and Bayer liquor are added to a 500 mL separatory funnel and placed in an oven at 60° C. for 2 hrs. The funnel is then shaken (by hand) for 2 minutes and then placed in the oven for 30 minutes. The funnel is then shaken again for 2 minutes and placed back in the oven for 1 hr to ensure the phases have fully disengaged. After 1 hr, the bottom Bayer liquor phase is drained off and the top impurity-loaded organic salt solution is collected for further use.

The concentrations of impurities present in the Bayer liquor prior to intermixing with the organic salt solution are determined and provided in Table 2 below. Concentrations of oxalate/succinate, acetate, formate and chloride are determined using ion chromatography (IC) (gradient method), while the concentration of Non-Purgable Organic Carbon (NPOC) is determined using a TOC analyzer such as, for example, Shimadzu Model TOC-5050A Total Organic Carbon Analyzer

TABLE 2

Impurities Present in Initial Bayer liquor:

| Average NPOC (g/L) | Average Ox/Suc (g/L) | Average acetate (g/L) | Average Formate (g/L) | Average Chloride (g/L) |
|---|---|---|---|---|
| 10.8855 | 2.0160 | 6.5643 | 2.3056 | 10.8062 | c. Intermixing the Impurity-Loaded Organic Salt Solution with a Stripping Solution Containing Sodium Bisulfate (NaHSO$_4$)

An impurity-loaded organic salt solution containing octyl (tributyl)phosphonium chloride as the organic salt is intermixed with a stripping solution containing sodium bisulfate (NaHSO$_4$).

The impurity-loaded organic salt solution is prepared as discussed in steps a. and b. above. The impurity-loaded organic salt solution is intermixed with 30% and 50% NaHSO$_4$ solutions at mass ratios of 1, 2, 5, and 10 to 1 using the same procedure as for extraction with Bayer liquor noted in step b. above. The concentration of impurities stripped from the impurity-loaded organic salt present in the impurity-loaded organic salt solution is shown in Tables 3a and 3b below and determined by IC (gradient method) and/or a TOC analyzer:

TABLE 3a

Concentration of Impurities Present in the Impurity-Loaded Organic Salt Solution:

| Impurity | Ox/Suc (g/L) | Acetate (g/L) | Formate (g/L) | Chloride (g/L) |
|---|---|---|---|---|
| Initial impurity-loaded organic salt | 1.4732 | 6.2912 | 2.2514 | 9.7565 |

TABLE 3b

Efficiency of Stripping Solution Containing NaHSO$_4$ in Removing Impurities from the Impurity-Loaded Organic Salt:

| Impurity-loaded organic salt to NaHSO$_4$ ratio (w/w) | % NaHSO$_4$ | Ave. wt % Oxalate/Suc removed | Ave. wt % Acetate removed | Ave. wt % Formate removed | Ave. wt % chloride removed |
|---|---|---|---|---|---|
| 1 | 30% | 33.4 | 19.7 | 28.5 | 29.5 |
| 2 | | 20.5 | 8.9 | 16.1 | 20.6 |
| 5 | | 14 | 8.7 | 11.3 | 13.9 |
| 10 | | 7 | −1 | 1.6 | 7.1 |
| 1 | 50% | 22.9 | −1.6 | 3.3 | 6.5 |
| 2 | | 10.3 | 2.7 | 5.4 | 8.5 |
| 5 | | 11.1 | 9.6 | 12.5 | 14.3 |
| 10 | | 7 | 1.7 | 2.5 | 7.4 | d. Intermixing the Impurity-Loaded Organic Salt Solution with a Stripping Solution Containing Sodium Nitrate (NaNO$_3$)

An impurity-loaded organic salt solution containing octyl (tributyl)phosphonium chloride as the organic salt is intermixed with a stripping solution containing sodium nitrate (NaNO$_3$).

The impurity-loaded organic salt solution is prepared as discussed in steps a. and b. above. The impurity-loaded organic salt solution is intermixed with equal masses (10 g each) of a stripping solution containing 12.5%, 25% and 50% NaNO$_3$ solutions using the same procedure as for Bayer extraction as described in step b. above. The amount of impurities stripped from the impurity-loaded organic salt present in the impurity-loaded organic salt solution is shown in Tables 4a and 4b below and determined by IC (gradient method) and/or a TOC analyzer.

TABLE 4a

Concentration of Impurities Present in the Impurity-Loaded Organic Salt Solution:

| Average NPOC (g/L) | Average Ox/Suc (g/L) | Average acetate (g/L) | Average Formate (g/L) | Average Chloride (g/L) |
|---|---|---|---|---|
| 6.100 | 0.318 | 6.404 | 2.278 | 64.319 |

TABLE 4b

Efficiency of Stripping Solution Containing NaNO$_3$ in Removing Impurities from the Impurity-Loaded Organic Salt:

| % NaNO$_3$ | Ave. wt % Ox/Suc | Ave. wt % Acetate | Ave. wt % Formate | Ave. wt % chloride |
|---|---|---|---|---|
| 12.5% | 91.7 | 81.9 | 82.1 | 58.5 |
| 25% | 92.0 | 98.0 | 98.2 | 93.0 |
| 50% | 92.6 | 98.8 | 98.9 | 97.2 | e. Intermixing the Aqueous Impurity-Loaded Organic Salt Solution with a Stripping Solution Containing Sodium Nitrite (NaNO$_2$)

An impurity-loaded organic salt solution containing octyl (tributyl)phosphonium chloride as the organic salt is intermixed with a stripping solution containing sodium nitrite (NaNO$_2$).

The impurity-loaded organic salt solution is prepared as discussed in steps a. and b. above. The impurity-loaded organic salt solution is intermixed with equal masses (10 g each) of stripping solution containing 25% NaNO$_2$ solution using the same procedure as for Bayer extraction noted in step b. above. The amount of impurities stripped from the impurity-loaded organic salt present in the impurity-loaded organic salt solution is shown in Tables 5a and 5b below and determined by IC (gradient method) and/or a TOC analyzer.

TABLE 5a

Concentration of Impurities Present in the Impurity-Loaded Organic Salt Solution:

| Average NPOC (g/L) | Average Ox/Suc (g/L) | Average acetate (g/L) | Average Formate (g/L) | Average Chloride (g/L) |
|---|---|---|---|---|
| 6.100 | 0.318 | 6.404 | 2.278 | 64.319 |

TABLE 5b

Efficiency of Stripping Solution Containing NaNO$_2$ in Removing Impurities from the Impurity-Loaded Organic Salt:

| % NaNO$_2$ | Ave. wt % Ox/Suc | Ave. wt % Acetate | Ave. wt % Formate | Ave. wt % chloride |
|---|---|---|---|---|
| 25% | 92.9 | 90.9 | 92.9 | 75.5 |

Example 3

Removal of Impurities from an Impurity-Loaded Organic Salt Solution Utilizing a Stripping Solution Containing Sodium Bicarbonate a. Equilibrating the Organic Salt An organic salt solution, containing an organic salt such as octyl(tributyl)phosphonium is equilibrated with $NaHCO_3$ solution using the following method: A 250 g of a 20% $NaHCO_3$ slurry (in deionized water) is stirred rapidly at 60° C. in a 500 mL reaction vessel. An equal mass (250 g) of the organic salt solution (74% organic salt in deionized water) is added with rapid stirring. After the addition of the organic salt solution, the mixing is stopped and the solution is allowed to reach 60° C. The mixture is then stirred for 2 minutes and then the phases are allowed to separate. The lower $NaHCO_3$ phase is drained off and a fresh 250 g of 15% $NaHCO_3$ (at 60° C.) is added. The mixture is stirred for 2 minutes and then the phases are allowed to separate. The lower $NaHCO_3$ phase is drained off and the upper equilibrated organic salt solution is saved for further use.

b. Intermixing the Organic Salt Solution with a Bayer Liquor

The organic salt solution is intermixed with Bayer liquor using the following method: equal masses (200 g) of equilibrated aqueous organic salt solution and Bayer liquor are added to a 500 mL separatory funnel and placed in an oven at 60° C. for 2 hrs. The funnel is then shaken (by hand) for 2 minutes and then placed in the oven for 30 minutes. The funnel is then shaken again for 2 minutes and placed back in the oven for 1 hr to ensure the phases have fully disengaged. After 1 hr, the bottom Bayer liquor phase is drained off and the top impurity-loaded organic salt solution is collected for further use.

The concentrations of impurities present in the Bayer liquor prior to intermixing with the aqueous organic salt solution are determined using IC (gradient method) and/or a TOC analyzer and provided in Table 6 below.

TABLE 6

Impurities Present in Initial Bayer liquor:

| Average NPOC (g/L) | Average Ox/Suc (g/L) | Average acetate (g/L) | Average Formate (g/L) | Average Chloride (g/L) |
|---|---|---|---|---|
| 17.9379 | 1.0472 | 3.0236 | 2.1251 | 4.0461 | c. Intermixing the Impurity-Loaded Organic Salt Solution with a Stripping Solution Containing Sodium Bicarbonate ($NaHCO_3$)

An impurity-loaded organic salt solution containing octyl(tributyl)phosphonium chloride as the organic salt is intermixed with a stripping solution containing 15% sodium bicarbonate.

An impurity loaded organic salt solution containing octyl(tributyl)phosphonium chloride as the organic salt is prepared according to steps a. and b. described above. The impurity loaded organic salt solution is contacted with a 15% $NaHCO_3$ solution at impurity loaded organic salt solution: $NaHCO_3$ mass ratios of 1 to 0.5, 1, 1.5, 2, 2.5, 3, and 4, using the same procedure as for extraction with Bayer liquor in step b. noted above. The amount of impurities stripped from the impurity-loaded organic salt present in the impurity-loaded organic salt solution is shown in Tables 7a and 7b below and determined by IC (gradient method) and/or a TOC analyzer.

TABLE 7a

Concentration of Impurity-Loaded Organic Salt Present in the Aqueous Impurity-Loaded Organic Salt Solution:

| | Average NPOC (g/L) | Average Ox/Suc (g/L) | Average acetate (g/L) | Average Formate (g/L) | Average Chloride (g/L) |
|---|---|---|---|---|---|
| Initial impurity-loaded organic salt | 11.8841 | 0.5310 | 3.2831 | 2.1781 | 49.1057 |

TABLE 7b

Efficiency of Stripping Solution Containing $NaHCO_3$ in Removing Impurities from the Impurity-Loaded Organic Salt:

| Organic salt:stripping solution Ratio | Ave. wt % NPOC removed | Ave. wt % Ox/Succ removed | Ave. wt % Acetate removed | Ave. wt % Formate removed | Ave. wt % chloride removed |
|---|---|---|---|---|---|
| 1:4 | 97.8 | 84.5 | 49.2 | 58.2 | 42.2 |
| 1:3 | 75.3 | 85.2 | 41.7 | 51.0 | 36.1 |
| 1:2.5 | 72.4 | 97.2 | 44.5 | 48.6 | 31.4 |
| 1:2 | 59.8 | 100.0 | 58.1 | 45.2 | 27.9 |
| 1:1.5 | 53.9 | 100.0 | 59.4 | 44.7 | 20.7 |
| 1:1 | 37.4 | 79.3 | 47.7 | 34.7 | 11.9 |
| 1:0.5 | 16.7 | 63.6 | 28.0 | 7.9 | −15.3 |

Note that a negative number indicates an increase of a species concentration in the organic salt phase

Example 4

Removal of Impurities from an Impurity-Loaded Organic Salt Solution Utilizing a Stripping Solution Containing Sodium Chloride and a Wash Solution Containing Sodium Hydroxide An impurity-loaded organic salt is regenerated by intermixing with a stripping solution containing 25% NaCl in a [1:1] mass ratio, followed by a wash step utilizing a wash solution containing 10% NaOH in a [1:1] mass ratio. The following procedure is conducted at 60° C.:

a. Equilibrating of Organic Salt

A 74% organic salt solution containing Octyl(tributyl) phosphonium chloride is first conditioned by contacting the solution with a 10% NaOH solution in a [1:1] mass ratio of organic salt:10% NaOH. The 10% NaOH phase is drained and fresh 10% NaOH solution in a [1:1] mass ratio of 10% NaOH is added. The 10% NaOH phase (bottom phase) is removed and the organic salt is prepared to remove impurities from an industrial process stream.

b. Extraction of Impurities from an Industrial Process Stream

The conditioned organic salt is intermixed as a solution with an equal mass of spent Bayer liquor in a separatory funnel. The mixture is shaken for 2 minutes and the phases are allowed to separate. The mixture is shaken for 2 minutes a second time and the phases are allowed to disengage for the final separation. The phases are physically separated and analyzed via the ion chromatography method and/or a TOC analyzer to determine the concentration of impurities present in each phase. The concentration of impurities present in phase containing the impurity-loaded organic salt is shown in Table 8 below.

c. Intermixing the Impurity Loaded Organic Salt with a Stripping Solution

The phase containing the impurity-loaded organic salt, i.e., the impurity-loaded organic salt solution, is intermixed with an equal mass of 25% NaCl stripping solution. The mixture is shaken for 2 minutes two times and the phases are then allowed to disengage. The phases are separated and the concentration of impurities present in both phases is shown in Table 8.

d. Intermixing the Impurity Reduced Organic Salt with a Wash Solution

The phase containing the stripped organic salt, i.e., the impurity reduced organic salt solution, is then intermixed with an equal mass of 10% NaOH wash solution. As above, the mixture is shaken for 2 minutes two times and the phases are then allowed to disengage. The phases are separated and the concentration of impurities present in the both phases is shown in Table 8.

e. Providing the Washed Organic Salt to an Industrial Process Stream

The phase containing the washed organic salt, i.e., the washed organic salt phase, is provided to an equal mass of fresh spent Bayer liquor. As above, the mixture is shaken for 2 minutes two times and the phases are then allowed to disengage. The phases are separated and the concentration of impurities in both phases for the second extraction is shown in Table 8.

The 15% $NaHCO_3$ phase is drained and fresh 15% $NaHCO_3$ in a [1:1] mass ratio of 15% $NaHCO_3$ is added. The phase containing 15% $NaHCO_3$ is removed and the organic salt is ready to remove impurities from an industrial process stream.

b. Extraction of Impurities from an Industrial Process Stream

The conditioned organic salt is intermixed with an equal mass of spent Bayer liquor in a separatory funnel. The mixture is shaken for 2 minutes and the phases are allowed to separate. The mixture is shaken for 2 minutes a second time and the phases are allowed to disengage for the final separation. The phases are physically separated and analyzed via IC (gradient method) and/or a TOC analyzer to determine the concentration of impurities present in each phase. The concentration of impurities is shown in Table 9 below.

c. Intermixing the Impurity Loaded Organic Salt with a Stripping Solution

The phase containing the impurity-loaded organic salt, i.e., the impurity-loaded organic salt solution, is intermixed an equal mass of 15% $NaHCO_3$ stripping solution. As above, the mixture is shaken for 2 minutes two times and the phases are then allowed to disengage. The phases are separated and the concentration of impurities present in both phases is shown in Table 9.

TABLE 8

Average percent of Impurities Removed from the organic salt phase or the industrial process stream phase

| Step | Ave. wt % NPOC removed | Ave. wt % Ox/Succ removed | Ave. wt % Acetate removed | Ave. wt % Formate removed | Ave. wt % chloride removed | Ave. wt % Sulfate removed |
|---|---|---|---|---|---|---|
| Extraction #1, from spent liquor | 43.7 | 25.6 | 42.8 | 65.1 | 79.7 | 7.3 |
| Strip (25% NaCl), from impurity-loaded organic salt phase | 100* | 100* | 83.9 | 87.1 | −130.9 | 88.7 |
| Wash (10% NaOH) from stripped impurity-loaded organic salt phase | 0 | 100* | 27.4 | 26.3 | 11.8 | 19.5 |
| Extraction #2, from fresh spent liquor | 44.6 | 7.1 | 43.5 | 59.8 | 29.0 | 0.4 |

*Impurity below instrument detection limit in the organic salt phase, assumed 100% removal

Note that a negative number indicates an increase of a species concentration in the organic salt phase Example 5

Removal of Impurities from an Impurity-Loaded Organic Salt Solution Utilizing a Stripping Solution Containing Sodium Bicarbonate and a Wash Solution Containing Sodium Hydroxide An impurity-loaded organic salt is regenerated by intermixing with a stripping solution containing 15% $NaHCO_3$ in a [1:1] mass ratio, followed by a wash step utilizing a wash solution containing 10% NaOH in a [1:1] mass ratio. The following procedure is conducted at 60° C.:

a. Equilibrating of Organic Salt

A 74% organic salt solution containing octyl(tributyl) phosphonium chloride is conditioned by intermixing the organic salt solution with a [1:1] mass ratio of 15% $NaHCO_3$.

d. Intermixing the Impurity Reduced Organic Salt with a Wash Solution

The phase containing the stripped organic salt, i.e., the impurity reduced organic salt solution, is then intermixed with and equal mass of 10% NaOH wash solution. As above, the mixture is shaken for 2 minutes two times and the phases are then allowed to disengage. The phases are separated and the concentration of impurities present in both phases is shown in Table 9.

e. Providing the Washed Organic Salt to an Industrial Process Stream

The phase containing the washed organic salt, i.e., the washed organic salt phase, is provided to equal mass of fresh spent Bayer liquor. As above, the mixture is shaken for 2 minutes two times and the phases are then allowed to disengage. The phases are separated and the concentration of impurities present in both phases is shown in Table 9.

TABLE 9

Concentration of Impurities Present in the organic salt phase or the industrial process stream phase

| Step | Ave. % NPOC removed | Ave. % Ox/Succ removed | Ave. % Acetate removed | Ave. % Formate removed | Ave. % chloride removed | Ave. % Sulfate removed |
|---|---|---|---|---|---|---|
| Extraction 1 | 54.0 | 24.2 | 71.3 | 88.5 | 60.4 | 12.4 |
| Strip (15% NaHCO3) | 41.6 | 69.3 | 19.0 | 23.4 | 11.6 | 93.9 |
| Wash (10% NaOH) | 39.3 | 74.0 | 58.9 | 35.4 | 18.3 | 0 |
| Extraction 2 | 45.3 | 21.9 | 23.4 | 21.9 | 60.2 | 70.8 |

What is claimed:

1. A method of removing impurities from an organic salt solution, the method comprising:
providing an impurity-loaded organic salt solution comprising oxalate; and
intermixing the impurity-loaded organic salt solution with a stripping solution to form a biphasic mixture,
wherein the intermixing is effective to reduce a concentration of oxalate in the impurity-loaded organic salt solution, thereby removing impurities from the organic salt solution and forming an impurity reduced organic salt solution phase and a primarily stripping solution phase, wherein organic salt present in the impurity-loaded organic salt solution comprises:
a cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium; and
an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

2. A method according to claim 1, wherein the impurity-loaded organic salt solution comprises from about 1% to about 97% water, by weight based on total weight of the impurity-loaded organic salt solution.

3. A method according to claim 1, wherein the intermixing comprises feeding the impurity-loaded organic salt solution and stripping solution to an in-line mixer.

4. A method according to claim 1, wherein the intermixing comprises feeding the impurity-loaded organic salt solution and stripping solution to a continuous mixer/settler unit.

5. A method according to claim 1, wherein the stripping solution comprises a compound having an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

6. A method according to claim 1, wherein the impurity-loaded organic salt solution is intermixed with the stripping solution at a mass ratio of impurity-loaded organic salt solution to stripping solution in a range of [1:100] to [1:0.01].

7. A method according to claim 1, further comprising:
at least partially separating the impurity reduced organic salt solution from the primarily stripping solution phase to form a separated impurity reduced organic salt solution and a separated stripping solution phase.

8. A method according to claim 7, further comprising:
providing the separated impurity reduced organic salt solution to an industrial process stream.

9. A method according to claim 8, wherein the industrial process stream is selected from a group consisting of a Bayer process stream, a nuclear waste stream, a brine from a high ionic strength system, and an effluent from a mining operation.

10. A method according to claim 7, further comprising:
intermixing the impurity reduced organic salt solution with a wash solution in an amount effective to form a biphasic mixture, wherein the intermixing is effective to form a washed organic salt phase and a primarily wash solution phase.

11. A method according to claim 10, wherein the separated impurity reduced organic salt solution is intermixed with the wash solution at a mass ratio of separated reduced concentration phase to wash solution in a range between [1:100] to [1:0.01].

12. A method according to claim 10, wherein the wash solution comprises an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

13. A method according to claim 1, wherein the impurities further comprise an impurity selected from a group consisting of humates, humate decomposition products, metals, acetate, formate, sulfate, chloride, fluoride, phosphate and combinations thereof.

14. A method according to claim 1, wherein organic salt present in the impurity-loaded organic salt solution comprises a quaternary organic cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium.

15. A method according to claim 1, wherein organic salt present in the impurity-loaded organic salt solution is selected from a group consisting of: octyl(tributyl) phosphonium chloride, 1-octyl-2,3-dimethylimidazolium chloride, 1-butyl-3-methylimidazolium chloride, 1-butyl-2,3-dimethylimidazolium chloride, butylmethylpyrolidinium, octyl(tributyl) phosphonium hydroxide, tetrabutylphosphonium hydroxide, tetrabutylammonium hydroxide, tetradecyl(tributyl)phosphonium chloride, octyl(tributyl)ammonium chloride, tetradecyl(trihexyl) phosphonium bromide, tetrahexylammonium chloride, tributyl(hexyl) phosphonium chloride, tetradecyl(trihexyl)phosphonium chloride, tetrabutylphosphonium chloride, tetrabutylphosphonium chloride, tributylmethylammonium hydroxide, tetrapentylammonium hydroxide, dimethyl dicoco quaternary ammonium chloride, stearamidopropyldimethyl-2-hydroxyethyl ammonium nitrate, ethyltetradecyldiundecyl ammonium chloride, tallowalkyltrimethyl ammonium chloride, tetrahexylammonium bromide, butylmethylpyrrolidinium bis(trifluoromethylsulfonyl)imide, N,N,N-trimethyl-1-dodecanaminium chloride, benzyldimethylcocoalkylammonium chloride, N,N-dimethyl-N-dodecylglycine betaine, 1-octyl-2,3-dimethylimidazolium chloride, tributyl-8-hydroxyoctylphosphonium chloride, tetrapentylphosphonium hydroxide and combinations thereof.

16. A method of removing impurities from an industrial process stream, the method comprising:
provinding an organic salt solution that comprises an impurity-extracting amount of an organic salt, wherein the organic salt solution is at least partially immiscible with an industrial process stream comprising impurities;
intermixing the industrial process stream with the organic salt solution to form a first biphasic mixture, wherein the intermixing is effective to reduce a concentration of oxalate in the industrial process stream to form a phase containing an impurity-loaded organic salt solution and a phase containing an impurity reduced industrial process stream;
intermixing the impurity-loaded organic salt solution with a stripping solution to form a second biphasic mixture, wherein the intermixing of the impurity-loaded organic salt solution and the stripping solution is effective to reduce the concentration of impurities in the impurity-loaded organic salt solution and forming an impurity reduced organic salt solution; and
optionally intermixing the impurity reduced organic salt solution with a wash solution to form a third biphasic mixture, wherein the intermixing is effective to form a washed organic salt phase and a wash solution phase, wherein organic salt present in the impurity-loaded organic salt solution comprises:
a cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium; and
an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

17. A method according to claim 16, wherein the stripping solution comprises a compound having an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

18. A method according to claim 16, wherein the impurity-loaded organic salt solution is intermixed with the stripping solution at a mass ratio of organic salt solution to stripping solution in a range of [1:100] to [1:0.01].

19. A method according to claim 16, wherein the wash solution comprises an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

20. A method according to claim 16, wherein the impurity reduced organic salt solution is intermixed with the wash solution at a mass ratio of impurity reduced organic salt solution to wash solution in a range between [1:100] to [1:0.01].

21. A method according to claim 16, wherein the wash solution comprises sodium hydroxide.

22. A method according to claim 16, wherein the impurities further comprise an impurity selected from a group consisting of humates, humate decomposition products, metals, acetate, formate, sulfate, chloride, fluoride, phosphate and combinations thereof.

23. A method according to claim 16, wherein the industrial process stream is selected from a group consisting of a Bayer process stream, a nuclear waste stream, a brine from a high ionic strength system, and an effluent from a mining operation.

24. A method of removing impurities from an organic salt solution, the method comprising:
providing an impurity-loaded organic salt solution, wherein impurities in the impurity loaded organic salt solution are obtained from a Bayer process stream and comprise oxalate; and
intermixing the impurity-loaded organic salt solution with a stripping solution to form a biphasic mixture,
the intermixing is effective to reduce a concentration of impurities in the impurity-loaded organic salt solution, thereby removing impurities from the organic salt solution and forming an impurity reduced organic salt solution phase and a primarily stripping solution phase, wherein organic salt present in the impurity-loaded organic salt solution comprises:
a cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium; and
an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

25. A method of removing impurities from an organic salt solution, the method comprising:
providing an impurity-loaded organic salt solution, wherein impurities in the impurity-loaded organic salt solution comprise oxalate; and
intermixing the impurity-loaded organic salt solution with a stripping solution to form a biphasic liquid/liquid mixture,
the intermixing is effective to reduce a concentration of oxalate in the impurity-loaded organic salt solution, thereby removing impurities from the organic salt solution and forming an impurity reduced organic salt solution phase and a primarily stripping solution phase, wherein organic salt present in the impurity-loaded organic salt solution comprises:
a cation selected from the group consisting of phosphonium, ammonium, sulfonium, pyridinium, pyridazinium, pyrimidinium, pyrazinium, pyrazolium, imidazolium, thiazolium, oxazolium, pyrrolidinium, quinolinium, isoquinolinium, guanidinium, piperidinium and methylmorpholinium; and
an anion selected from the group consisting of fluoride, chloride, bromide, iodide, hydroxyl, alkylsulfate, dialkylphosphate, sulfate, nitrate, phosphate, sulfite, phosphite, nitrite, hypochlorite, chlorite, chlorate, perchlorate, carbonate, bicarbonate, carboxylate, bis(trifluoromethylsulfonyl)imide ([NTF$_2$]$^-$), tetrafluoroborate, and hexafluorophosphate.

* * * * *